June 21, 1927.
S. R. FRAIM
LOCKING DEVICE
Filed Oct. 24, 1925
1,633,172
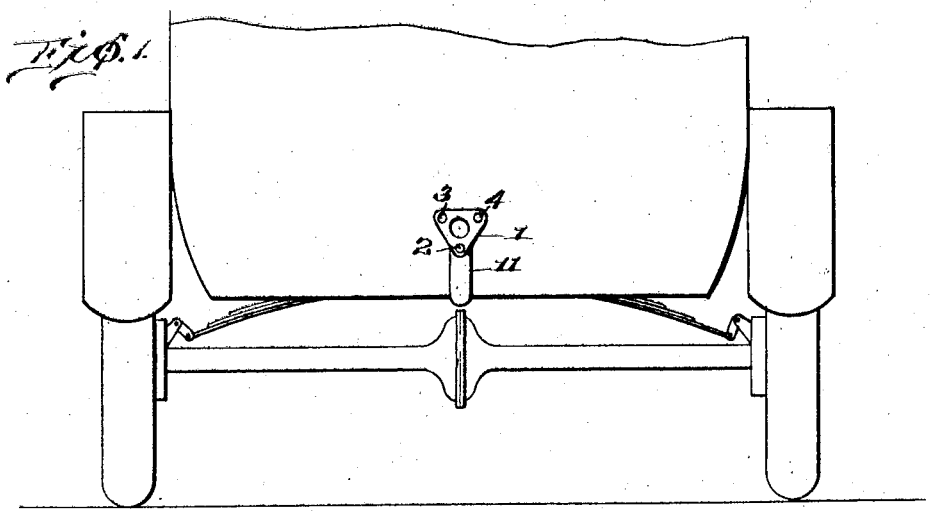
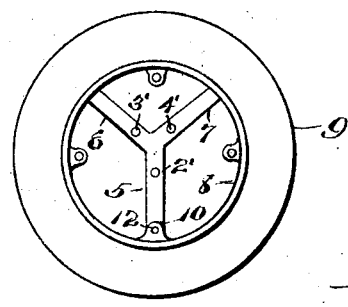
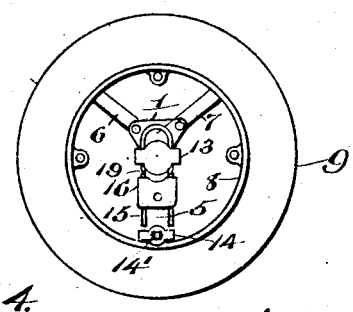
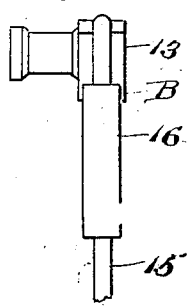
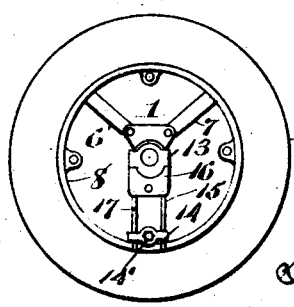
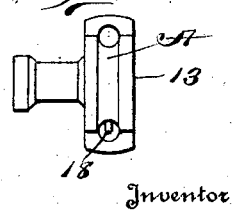
Inventor
Samuel R. Fraim
Robert H. Young
By
Attorney Patented June 21, 1927.

1,633,172

UNITED STATES PATENT OFFICE.

SAMUEL R. FRAIM, OF LANCASTER, PENNSYLVANIA.

LOCKING DEVICE.

Application filed October 24, 1925. Serial No. 64,674.

This invention relates in general to locking devices, and has for its object to provide a lock with its accompanying shackle in working combination with a plurality of retaining members, for the purpose of retaining a plurality of objects in locked relation.

A more particular object of my invention is to provide a combined device capable of locking an automobile spare tire on its rim and rim carrier, and also safeguarding against the removal of the carrier from the vehicle to which it is attached.

It is also an object of this invention to provide such a combined device which will be readily applied, easily operated by the proper key, and which will not only maintain the tire carrier and tire assembly locked to the body of the vehicle but also keep all of the parts of the assembly in locked relation to each other.

The proposed device is especially adapted for utility in connection with the 1926 Ford model spare tire carriers which consist in a rearwardly extending rod rigidly fastened to the chassis. This rod terminates in a triangular plate to which a Y shaped rim carrier is detachably bolted. The Y carrier has a bolt on its lower leg to pass through a lug integral with the tire rim.

In this connection it is proposed to substitute a pair of perforated wing nuts through which a U shaped shackle passes, the upper nut to take the place of one nut on the triangular plate, and the lower wing nut to be substituted for the nut on the bolt of the lower leg of the Y carrier. These wing nuts are for the purpose of providing fixed guides for the shackle which extends over the rim and is held in such position by means of a padlock interposed between said nuts and bearing against the upper one.

With the foregoing and other objects in view, the invention consists in the combination of parts and in the details of construction hereinafter described and claimed, certain embodiments of my invention being illustrated in the accompanying drawings, in which—

Figure 1 is a rear elevation of a 1926 model Ford automobile showing the rigidly attached base plate to which a tire carrier is adapted to be attached;

Figure 2 is a rear elevation of a Y shaped tire carrier (also adapted by the above, Ford model) with the tire and rim mounted thereon;

Figure 3 is a similar view showing the tire carrier and tire mounted on the base plate and my locking device in unlocked position;

Figure 4 is a similar view of the same as Figure 3, showing the locking device in locked position;

Figure 5 is an edge view of my shackle lock and wing nut;

Figure 6 is a top plan view of the upper nut employed.

Referring more particularly to the drawings, it will be noted that the base plate 1, which is the termination of a hollow rod rigidly bolted to the chassis of the Ford car, is provided with bolts 2, 3 and 4, the numeral 11 indicating the non-essential fact that the rod mentioned is hollow.

In Figure 2 is shown the tire 9 and rim 8 mounted on the Y shaped carrier having legs 5, 6 and 7. The rim 8 is provided with a plurality of integral lugs one of which is indicated at 10. These lugs, as is well known, are for the purpose of attaching the tire and rim to a running wheel of the car.

Referring to Figure 3, which shows the carrier assembly mounted on the base plate 1, it will be seen that the bolts 2, 3 and 4 of the base plate 1, pass through the apertures 2′, 3′ and 4′ of the carrier. The lower leg 5 of the carrier has a bolt 12 which passes through the lug 10 of the rim 8. The usual practice is to provide nuts to be screwed on the bolts 2, 3, 4 and 12 to retain the carrier assembly in place. This, however, does not provide any means for preventing unauthorized removal of the tire and rim by removing the nut from the bolt 12, or even the tire carrier and tire assembly by removing the three nuts on the bolts 2, 3 and 4.

Furthermore, it would not be practical to apply to this arrangement the conventional chain and padlock which are commonly used on other cars. If a chain were wrapped around the tire and rim it would not in any way prevent the removal of the same from the carrier. If the chain were to embrace the tire, rim and carrier, the removal of the nuts 2, 3 and 4 would allow the carrier and tire to be removed as a whole. An attempt to chain the tire would result in a chain wound first around the tire and rim, then around the carrier and then around behind the base plate. This practice would be so unwieldly as to become unfeasible in actual use.

Therefore, as shown in Figure 3, I have substituted for the usual nut a perforated wing nut 13 which is adapted to be screwed on the bolt 2 of the base plate after the bolt has passed through the aperture 2' of the tire carrier. Another wing nut 14 with a hexagonal head 14' is fitted on the bolt 12 of the carrier after this bolt has passed through the lug 10 of the tire rim 8. These two wing nuts are perforated to allow the two legs of the shackle 15 to pass therethrough and serve as guides for the shackle to slide vertically into and out of locking position. A padlock 16 also provided with perforations is mounted on the shackle whose legs have suitably arranged notches to be engaged by the locking mechanism of the padlock, the latter being interposed between the two nuts 14 and 13 and being adapted to bear against the latter. This Figure 3 shows the padlock unlocked and the shackle 15 withdrawn upwardly from the nut 14. To remove the tire and rim from the carrier, it is only necessary to unscrew the nut 14 by applying the standard socket wrench to the hexagonal head 14', the tire and rim then being free.

In Figure 4, which shows the device in locked position, the shackle 15 is thrust downwardly through the nut 14 to such an extent that the legs of the shackle partially overlap and partially abut against the outer surface of the rim 8. In doing this the top of the shackle is brought within the top groove A of the nut 13, which is formed to receive the shackle. The padlock is then brought into locked engagement with suitable notches in the legs of the shackle and the top of the padlock is recessed in the lower groove B on the nut 13.

This, as will be seen, maintains the rim 8 and carrier in locked relation to each other and both in turn to the base plate 1. To unlock the rim 8 from the carrier, it is necessary to withdraw the legs of the shackle from their overlapping position against the rim 8, and this requires an upward pull on the shackle. Obviously this cannot be done until the padlock 16 is unlocked from the notches in the shackle 15, and the parts cannot be pried apart because the upper and lower grooves on the nut 13 prevent the insertion of the tool.

In applying the device it is preferable to pass the shackle through the nut 15 and the padlock 16 and use the legs of the shackle for leverage purposes in screwing the nut 13 on the bolt 2 of the base plate. A pin 17 or other means may be provided on a leg of the shackle below the padlock to keep the latter from sliding completely off of the shackle, and a spring pressed pin 18 may be carried in the head of the nut 13 and extending into one of the bores of the wing to engage the notch 19 on the leg of the shackle to hold the shackle and nut in the maximum raised position thereby preventing the legs of the shackle from dropping down and interfering with the removal of the thumb nut and of the tire and rim.

The advantages of my device are apparent when it is considered that the tire rim and carrier are locked and unlocked in the most simple manner and by easily operated mechanism, which may be readily applied with the minimum change in the parts in connection with which they are especially adapted for use.

I claim—

1. In combination with a rigid base member, a pair of elements adapted to be superimposed one upon the other and upon said base member and maintained in such position by a pair of separate detachable retaining members, means for locking said pair of elements together and to said base member, said means comprising a shackle passing through said two retaining members in such a manner as to prevent the release of said pair of elements from each other and from said base, said shackle extending in overlapping relation with and in contact with one of said elements, and a padlock mounted on said shackle to maintain said shackle in the desired position.

2. In combination in a vehicle having a base plate rigidly secured thereto, a spider secured on said base plate by a detachable nut, a tire rim secured on said spider by a second detachable nut, means for locking said spider on said base plate and said tire rim on said spider, said means comprising a shackle extending through both of said nuts and in overlapping relation with said tire rim, a padlock interposed between said nuts and on said shackle and adapted to retain said shackle in the desired position.

3. In combination in a vehicle having a base plate rigidly secured thereto, a spider secured on said base plate by a detachable nut, a tire rim secured on said spider by a second detachable nut, means for locking said spider on said base plate and said tire rim on said spider, said means comprising a shackle extending through both of said nuts and in overlapping relation with said tire rim, a padlock interposed between said nuts and on said shackle and adapted to retain said shackle in the desired position, said tire rim being free from locked engagement from said spider upon the release of said shackle from the nut holding said spider and rim in engagement with each other.

4. In combination in a vehicle having a base plate rigidly secured thereto, a spider secured on said base plate by a detachable nut, a tire rim secured on said spider by a second detachable nut, means for locking said spider on said base plate and said tire rim on said spider, said means comprising a shackle extending through both of said nuts and in overlapping relation with said tire rim, a padlock interposed between said nuts and on said shackle and adapted to retain said shackle in the desired position, said tire rim being free from locked engagement from said spider upon the release of said shackle from the nut holding said spider and rim in engagement with each other, retaining means on said shackle for preventing the inadvertent release of said padlock therefrom when said spider and tire rim are unlocked from each other.

5. In combination in a vehicle having a base plate rigidly secured thereto, a spider secured on said base plate by a detachable nut, a tire rim secured on said spider by a second detachable nut, means for locking said spider on said base plate and said tire rim on said spider, said means comprising a U-shaped shackle extending through both of said nuts and in overlapping relation with said tire rim, a padlock interposed between said nuts and on said shackle and adapted to retain said shackle in the desired position, said nut, for securing said spider to said base plate, having its body portion curved to conform with the loop in said shackle, and said padlock being recessed to conform with the lower half of the periphery of the round body portion of said nut.

6. In combination in a vehicle having a base plate rigidly secured thereto, a spider secured on said base plate by a detachable nut, a tire rim secured on said spider by a second detachable nut, means for locking said spider on said base plate and said tire rim on said spider, said means comprising a U-shaped shackle extending through both of said nuts and in overlapping relation with said tire rim, a padlock interposed between said nuts and on said shackle and adapted to retain said shackle in the desired position, said first mentioned nut for securing said spider to the base plate having flanges which overlap the edge of the padlock and the curved portion of the shackle.

In testimony whereof, I affix my signature.

SAMUEL R. FRAIM.